United States Patent
Miyahara et al.

(10) Patent No.: US 11,381,700 B1
(45) Date of Patent: Jul. 5, 2022

(54) IMAGE FORMING APPARATUS AND RETURN CONTROL METHOD FOR RETURNING EACH PART FROM ENERGY SAVING STATE BY DETERMINING USAGE STATUS OF FUNCTION BY USER

(71) Applicant: KYOCERA Document Solutions Inc., Osaka (JP)

(72) Inventors: Norifumi Miyahara, Torrance, CA (US); Yoshihiro Osada, Torrance, CA (US); Keizen Kanazawa, Osaka (JP); Kunihiko Shimamoto, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/468,585

(22) Filed: Sep. 7, 2021

(51) Int. Cl.
*H04N 1/00* (2006.01)
*G06F 3/12* (2006.01)

(52) U.S. Cl.
CPC ....... *H04N 1/00891* (2013.01); *G06F 3/1221* (2013.01); *G06F 3/1229* (2013.01); *G06F 3/1256* (2013.01)

(58) Field of Classification Search
CPC . H04N 1/00891; G06F 3/1221; G06F 3/1229; G06F 3/1256
USPC ........................................................ 358/1.14
See application file for complete search history.

(56) References Cited

U.S. PATENT DOCUMENTS

| | | | |
|---|---|---|---|
| 9,485,377 B2* | 11/2016 | Utsunomiya | H04N 1/00896 |
| 2011/0219249 A1* | 9/2011 | Kuwahara | G06F 1/00 713/323 |
| 2011/0228327 A1* | 9/2011 | Maeda | H04N 1/00896 358/1.15 |
| 2012/0162690 A1* | 6/2012 | Ishiguro | H04N 1/00408 358/1.14 |
| 2014/0036292 A1* | 2/2014 | Higashi | H04N 1/00896 358/1.13 |
| 2017/0357471 A1* | 12/2017 | Hosono | H04N 1/00896 |
| 2018/0160000 A1* | 6/2018 | Takahashi | G06F 9/4843 |

FOREIGN PATENT DOCUMENTS

JP    2015-177315 A    10/2015

* cited by examiner

*Primary Examiner* — Allen H Nguyen
(74) *Attorney, Agent, or Firm* — Hawaii Patent Services; Nathaniel K. Fedde; Kenton N. Fedde

(57) ABSTRACT

Provided is an image forming apparatus that determines the usage status of a function by a user and improves power consumption efficiency. The image forming apparatus is capable of switching between an energy saving mode and a normal mode in which power consumption is larger than that of the energy saving mode. The power supply control unit determines whether or not power is supplied depending on the usage status of the function by the user. The power supply control unit controls the power supply of the operation panel unit, the document reading unit, and the image forming unit to be turned on or off, respectively, when returning from the energy saving mode to the normal mode according to the determination.

12 Claims, 4 Drawing Sheets

| TYPE OF FUNCTION | OPERATION PANEL UNIT 16 | DOCUMENT REAING UNIT 12 | IMAGE FORMING UNIT 17 |
|---|---|---|---|
| SCANNING | ON | ON | OFF |
| COPYING (COPY) | ON | ON | ON |
| DOCUMENT BOX PRINTING | ON | OFF | ON |
| DOCUMENT BOX TRANSMISSION | ON | OFF | OFF |
| FACSIMILE | ON | ON | OFF |
| PRINTING | OFF | OFF | OFF |

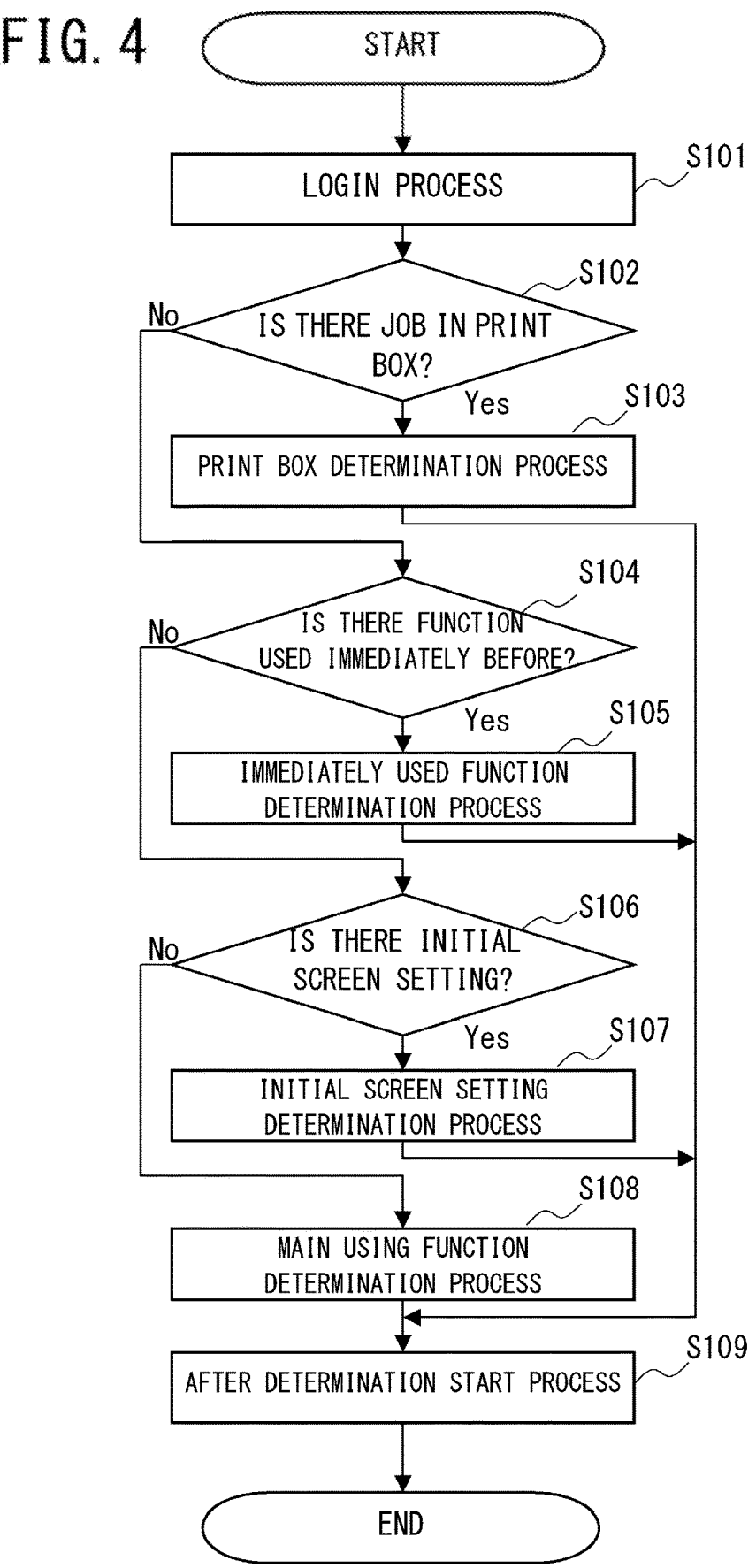

ical problems, it has been required to reduce the electric power used in the image forming apparatus. Therefore, some image forming apparatuses can switch between an energy saving mode and a normal mode in which power consumption is larger than that of the energy saving mode.

IMAGE FORMING APPARATUS AND RETURN CONTROL METHOD FOR RETURNING EACH PART FROM ENERGY SAVING STATE BY DETERMINING USAGE STATUS OF FUNCTION BY USER

BACKGROUND

The present disclosure relates to an image forming apparatus and a return control method, and more particularly to an image forming apparatus and a return control method including an operation panel unit, a document reading unit, and an image forming unit.

Typically, there is an image forming apparatus such as multifunctional peripherals (MFPs) capable of printing documents and images.

In recent years, due to environmental problems, it has been required to reduce the electric power used in the image forming apparatus. Therefore, some image forming apparatuses can switch between an energy saving mode and a normal mode in which power consumption is larger than that of the energy saving mode.

In a typical image forming apparatus, if it is determined that the user of the image forming apparatus has the authority to use a plurality of functional units, it is controlled to supply electric power to the plurality of functional units. On the other hand, if it is determined that the user does not have the authority to use the plurality of functional units, the control is performed so as not to supply power to the plurality of functional units.

SUMMARY

An image forming apparatus according to the present disclosure is an image forming apparatus capable of switching between an energy saving mode and a normal mode that consumes more power than the energy saving mode, including: an operation panel unit that allows a user to operate and instruct; a document reading unit that reads a mounted document according to the user's scanning instruction; an image forming unit that forms an image on recording paper according to the user's output instruction; and a power control unit configured to determine whether or not power is supplied depending on usage status of function by the user, and, when returning from the energy saving mode to the normal mode, control each of the power supplies of the operation panel unit, the document reading unit, and the image forming unit to be turned on or off according to determination.

A return control method according to the present disclosure is a return control method executed by an image forming apparatus capable of switching between an energy saving mode and a normal mode that consumes more power than the energy saving mode, and the image forming apparatus having an operation panel that allows users to operate and instruct, a document reading unit that reads a mounted document according to the user's scanning instruction, an image forming unit that forms an image on the recording paper according to the output instruction of the user, including the steps of: determining whether or not power is supplied depending on usage status of function by the user, and, controlling, when returning from the energy saving mode to the normal mode, each of the power supplies of the operation panel unit, the document reading unit, and the image forming unit to be turned on or off according to determination.

BRIEF DESCRIPTION OF THE DRAWINGS

FIG. 3 is a conceptual diagram showing an example of the functional power saving setting as shown in FIG. 2: and FIG. 4 is a flowchart of the return control process according to the embodiment of the present disclosure.

DETAILED DESCRIPTION

Embodiment

[System Configuration of Image Forming Apparatus 1]

Figure 1:
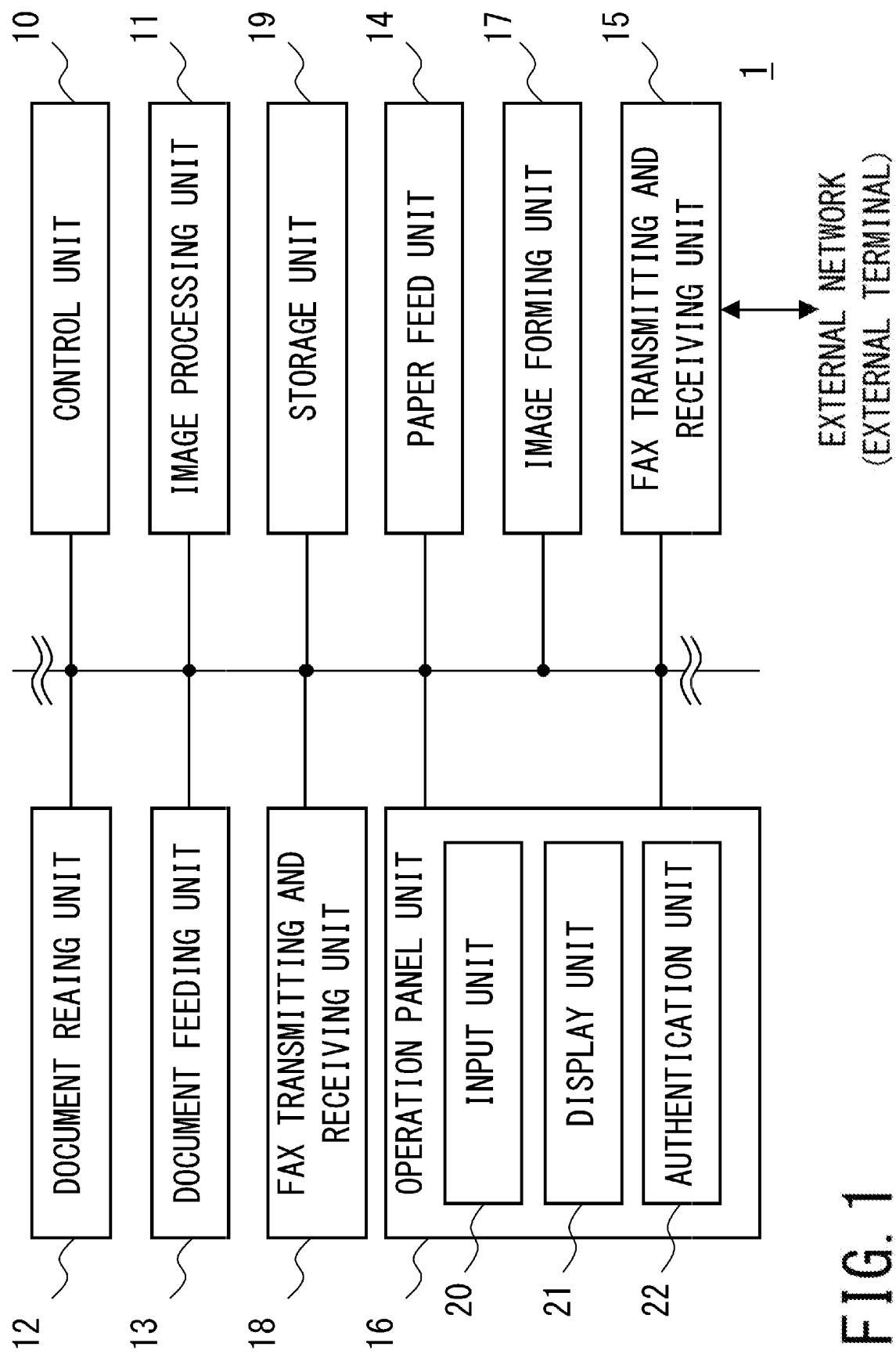
FIG. 1 is a block diagram showing a system configuration of an image forming apparatus according to an embodiment of the present disclosure.

Firstly, with reference to FIG. 1, a system configuration of the image forming apparatus 1 is described.

The image forming apparatus 1 includes a control unit 10, an image processing unit 11, a document reading unit 12, a document feeding unit 13, a paper feeding unit 14, a network transmitting and receiving unit 15, an operation panel unit 16, an image forming unit 17, and a fax transmitting and receiving unit 18 and storage unit 19, and the like. Each unit is connected to the control unit 10, and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, A processor for specific applications), or the like.

The control unit 10 reads out the control program stored in the ROM or HDD of the storage unit 19, expands the control program in the RAM, and executes it, so that the control unit 10 can be operated as each part of the functional block as described later. Further, the control unit 10 controls the entire apparatus according to instruction information input from an external terminal or an operation panel unit 16.

The image processing unit 11 is a control calculation unit such as a DSP (Digital Signal Processor) or a GPU (Graphics Processing Unit), or the like. The image processing unit 11 performs image processing on the image data. The image processing may be, for example, processing such as enlargement/reduction, density adjustment, gradation adjustment, image improvement, or the like.

Further, the image processing unit 11 stores the image read by the document reading unit 12 in the storage unit 19 as print data. At this time, the image processing unit 11 can also convert the print data into an electronic document such as PDF, or the like, or an image data file such as TIFF, or the like. Further, the image processing unit 11 may be able to execute at least a part of OCR (Optical Character Recognition) processing.

The document reading unit 12 reads the placed document according to the reading instruction by the user. Further, the document reading unit 12 is arranged above the main body unit of the image forming apparatus 1.

The document reading unit 12 includes a scanner, platen glass, and a document reading slit. When reading a document placed on the platen glass, the document reading unit 12 moves the scanner to a position facing the platen glass and scans the document placed on the platen glass to acquire image data. The document reading unit 12 stores the acquired image data in the storage unit 19.

Further, when reading the document supplied from the document feeding unit 13, the document reading unit 12 moves the scanner to a position facing the document reading slit. Then, the document reading unit 12 reads the document through the document reading slit in synchronization with the document transport operation by the document feeding unit 13 to acquire image data. The document reading unit 12 stores the acquired image data in the storage unit 19.

The document feeding unit 13 conveys the document read by the document reading unit 12. The document feeding unit 13 is arranged above the document reading unit 12.

The document feeding unit 13 includes a document placing unit and a document transporting mechanism. The document feeding unit 13 feeds the documents placed on the document placing unit to the document reading unit 12 one by one by the document transport mechanism.

The paper feeding unit 14 feeds the recording paper one by one toward the image forming unit 17. The paper feed unit 14 is provided in the main body unit.

The network transmitting and receiving unit 15 is a network connection unit including a LAN board, a wireless transmitter/receiver, and the like, for connecting to an external network. The external network of the present embodiment is, for example, a LAN (Local Area Network), a wireless LAN (Wi-Fi (registered trademark)), a WAN (Wide Area Network), a mobile phone network, a voice telephone network, or the like.

The network transmitting and receiving unit 15 transmits/receives data on a data communication line, and it transmits/receives a voice signal on a voice telephone line.

The operation panel unit 16 is a unit that is operated and instructed by the user.

The operation panel unit 16 includes an input unit 20, a display unit 21, and an authentication unit 22. Further, the operation panel unit 16 is arranged on the front side of the image forming apparatus 1.

The input unit 20 is a button, a touch panel, or the like, for acquiring an instruction for the image forming apparatus 1 by the user. The buttons of the input unit 20 of the operation panel unit 16 are a numeric keypad, start button, cancel button, function switching button, buttons of instruction to the job 300 (FIG. 2), and the like.

In the present embodiment, switchable functions may include functions such as scanning, copying (copy), document box printing, document box transmission, facsimile transmission, printing, and the like.

Among these, scanning is a function of scanning a document placed on a document feeding unit 13 or the platen glass by a document reading unit 12 and transmitting or storing it as a job 300, which is image data or document data. Here, the transmitting or storing destination may be an external transmission destination, a document box 230 (FIG. 2), or an external recording medium. The external destination is an external terminal, a user-specified e-mail address, a FTP (File Transfer Protocol) address, a SMB folder, NAS (Network Attached Storage), cloud storage, another facsimile apparatus, or the like. The external recording medium is a USB memory connected with the operation panel unit 16, or the like.

The copying (copy) is a function that a document placed on the document feeding unit 13 or the platen glass is read by a document reading unit 12, formed an image on recording paper by image forming unit 17 and outputs the image.

The document box print is a function that the input unit 20 allows the user to select the document data stored as the job 300 in the document box 230, which is described later, and the image forming unit 17 forms an image on the recording paper and outputs the image.

The document box transmission is a function of transmitting the document data stored as the job 300 in the document box 230 to the external destination.

The facsimile transmission is a function that a document placed on a document feeding unit 13 is read by a document reading unit 12 and transmitted to another facsimile apparatus by a fax transmitting and receiving unit 18.

The printing is a function that the image forming unit 17 forms an image of the document data as the job 300 acquired from the external terminal, the external recording medium, or the like, on recording paper and outputs it.

Further, the instruction to the job 300 may include instructions such as printing, transmitting, storing, or the like, for the selected document.

Figure 2:
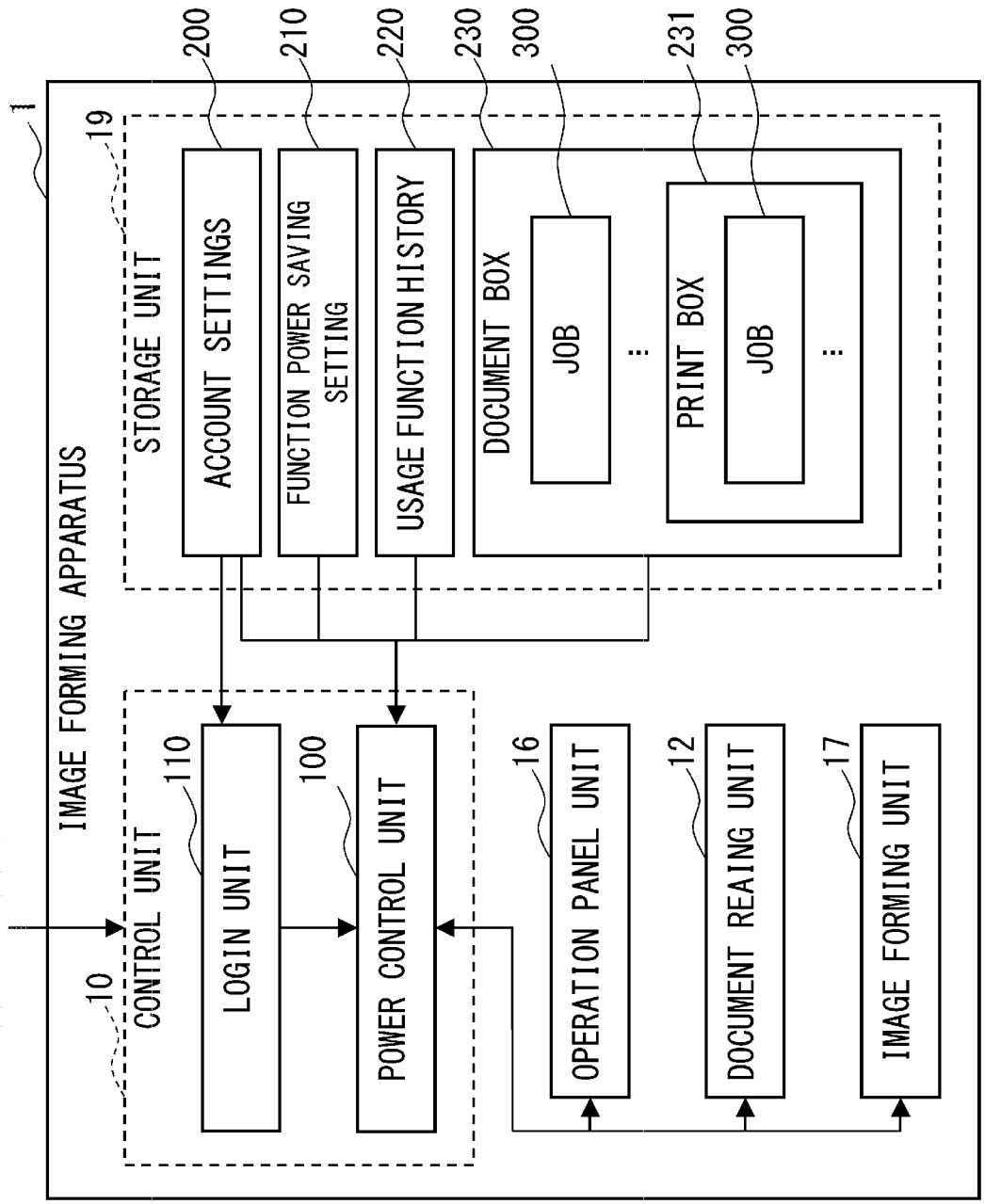
FIG. 2 is a block diagram showing a functional configuration of the image forming apparatus as shown in FIG. 1.

Also, according to the user's instruction acquired from the operation panel unit 16, it is possible to input and change the information of each user in the account setting 200 (FIG. 2).

The display unit 21 is a unit that presents various information to the user and draws buttons for the touch panel. The display unit 21 includes an LCD (Liquid Crystal Display), an organic EL (Electro Luminescence) display, an LED (Light Emitting Diode), and the like. In the present embodiment, a screen customized for each user may be displayed on the display unit 21. This screen includes the initial screen displayed at login.

The input unit 20 and the display unit 21 of the operation panel unit 16 may be integrally formed as like a touch panel display.

The authentication unit 22 is a device for performing user authentication. The authentication unit 22 may be a device that reads a user's card, such as a contact-type or non-contact-type IC card reader, a magnetic card reader, or the like. Alternatively, the authentication unit 22 may be a biometric authentication device such as a fingerprint sensor, a vein pattern sensor, an iris camera, or the like.

The image forming unit 17 forms an image on the recording paper according to the output instruction of the user. Specifically, the image forming unit 17 causes the recording paper to form an image of the image data, which is stored in the storage unit 19, read by the document reading unit 12, or acquired from an external terminal.

The image forming unit 17 includes a photoconductor drum, an exposure unit, a developing unit, a transfer unit, a fixing unit, and the like. The image forming unit 17 records a toner image on a recording paper by executing an image forming process including charging, exposure, development, transfer, and fixing.

The FAX transmitting and receiving unit 18 transmits/receives a facsimile. The FAX transmitting and receiving unit 18 can receive a facsimile from another FAX apparatus via a voice line, store the FAX data as the image data in the storage unit 19, and cause the image forming unit 17 to form an image.

Further, the FAX transmitting and receiving unit 18 can convert the document read by the document reading unit 12 and the network FAX data transmitted from the external terminal into image data and facsimile-transmit to another FAX apparatus by voice line.

The storage unit 19 is a non-transitory recording medium of a semiconductor memory such as a ROM (Read Only Memory) or a RAM (Random Access Memory), or the like, or an HDD (Hard Disk Drive), or the like.

The RAM of the storage unit 19 keeps the stored contents by a function such as self-refreshing even in a power saving state in the energy saving mode.

A control program for controlling the operation of the image forming apparatus 1 is stored in the ROM or HDD of the storage unit 19. In addition to this, the storage unit 19 stores various data. Among these various data, in the present embodiment, the data used for power saving in the energy saving mode is described later.

In the image forming apparatus 1, the control unit 10 and the image processing unit 11 may be integrally formed such as a GPU built-in CPU, a chip-on module package, and an SOC (System On a Chip).

Further, the control unit 10 and the image processing unit 11 may have a built-in RAM, ROM, flash memory, or the like.

[Functional Configuration of Image Forming Apparatus 1]

Here, with reference to FIG. 2, the functional configuration of the image forming apparatus 1 is described.

The control unit 10 of the image forming apparatus 1 includes a power supply control unit 100 and a login unit 110.

The storage unit 19 stores the account setting 200, the function power saving setting 210, the usage function history 220, and the document box 230.

The power supply control unit 100 determines whether or not power is supplied depending on usage status of the function by the user. The power supply control unit 100 controls the power supply of each unit when returning from the energy saving mode to the normal mode according to the determination. In the present embodiment, the power supply control unit 100 controls the power supplies of the operation panel unit 16, the document reading unit 12, and the image forming unit 17 to be turned on or off, respectively.

Specifically, the power supply control unit 100 determines the usage status of function based on presence or absence of a job 300 for which an image is to be formed, function used immediately before, initial screen setting, and function mainly used.

The power supply control unit 100, as for the presence or absence of the job 300 for which the image is to be formed, when the job 300 is stored in the print box 231 in which the job 300 is erased after printing, controls the power supply of each part according to the setting of the document box print function of the function power saving setting 210.

The power supply control unit 100 also controls the power supply of each unit according to each function of the function power saving setting 210 for the function used immediately before, the initial screen setting, and the function mainly used.

The power supply control unit 100 can also calculate the usage rate of the function with reference to the usage function history 220 and determine the function mainly used.

The login unit 110 authenticates the user and gives permission to use the image forming apparatus 1. Therefore, the login unit 110 performs authentication based on the account setting 200 when the user makes an authentication request from the input unit 20 or the authentication unit 22 of the operation panel unit 16, or the external terminal.

The account setting 200 stores ID (Identification), PIN (Personal Identification Number), password, biometric information, card ID, authority indicating available functions, information indicating belonging group, and the like for each user.

In the present embodiment, the account setting 200 may also include the initial screen setting for displaying the initial screen customized for each user. In the present embodiment, this initial screen is a screen that is displayed on the display unit 21 of the operation panel unit 16 at the time of login and presents an executable function. That means, in the image forming apparatus 1, it is possible to change the initial screen for each user and set it as the initial screen setting of the account setting 200.

The function power saving setting 210 is data used when determining whether or not power is supplied depending on the usage status of the function in order to save power. In the present embodiment, the function power saving setting 210 includes a setting for controlling the power supply of each unit according to the determination of the usage status of the function by the power supply control unit 100.

The details of the function power saving setting 210 is described later.

The usage function history 220 is historical data indicating the status of the function used by the user. In the present embodiment, the usage function history 220 records the history of the functions used immediately before the user and the functions used up to a specific period before.

In addition, the usage function history 220 is also set to the last set time for determining the function that the user has been used immediately before. The last set time can be set or changed, for example, within a few minutes immediately before login to a few hours.

The document box 230 is an area of a storage folder for each user. For example, the document box 230 can store document data as the job 300. This document data is selected according to the user's instruction and can be printed out by the document box print function. Alternatively, it may be able to transmit this document data to the external destination by the document box transmission function. Further, the document box 230 can also store document data acquired from the external terminal or the external recording medium according to a user's instruction. In addition, the document box 230 can also store document data such as PDF to which the scanned image data has been converted. It is also possible to delete the document data in the document box 230 according to the user's instruction. That is, the document data as the job 300 is usually retained until it is deleted.

On the other hand, in the present embodiment, the document box 230 also includes the print box 231, which is a temporary storage area in which the document data is automatically deleted after printing.

Next, with reference to FIG. 3, the details of the functional power saving setting 210 is described.

In the present embodiment, the functional power saving setting 210 is set for each function as to whether or not each of the operation panel unit 16, the document reading unit 12, and the image forming unit 17 is turned on or off when returning from the energy saving mode.

Specifically, in the case of the scanning function, the function power saving setting 210 includes a setting for controlling the power of the operation panel unit 16 and the document reading unit 12 to be turned on and the power of the image forming unit 17 to be turned off. Further, in the case of the copying (copy) function, the function power saving setting 210 includes a setting for controlling the power of the operation panel unit 16, the document reading unit 12, and the image forming unit 17 to be turned on. Further, in the case of the document box print function, the function power saving setting 210 includes a setting for controlling the power of the operation panel unit 16 and the image forming unit 17 to be turned on and controlling the power of the document reading unit 12 to be turned off. Further, in the case of the document box transmission function, the function power saving setting 210 includes a setting for controlling the power supply of the operation panel unit 16 to be turned on and the power supply of the document reading unit 12 and the image forming unit 17 to be turned off. Further, in the case of the facsimile function, the function power saving setting 210 includes a setting for controlling the power of the operation panel unit 16 and the document reading unit 12 to be turned on and controlling the power of the image forming unit 17 to be turned off. Also, in the case of the printing function, the functional power saving setting 210 includes a setting for controlling the power of the operation panel unit 16, the document reading unit 12, and the image forming unit 17 to be turned off.

Here, the control unit 10 of the image forming apparatus 1 is made to function as the power supply control unit 100 and the login unit 110 by executing the control program stored in the storage unit 19.

Further, each part of the image forming apparatus 1 as described above becomes a hardware resource for executing the return control method according to the present disclosure.

In addition, apart or any combination of the above-mentioned functional configurations may be configured in hardware or circuit by IC, programmable logic, FPGA (Field-Programmable Gate Array), or the like.

[Return Control Process by Image Forming Apparatus 1]

Next, with reference to FIG. 4, the return control process by the image forming apparatus 1 according to the embodiment of the present disclosure is described.

The return control process according to the present embodiment is a process of controlling each part when the image forming apparatus 1 returns from the energy saving mode to the normal mode. Specifically, when the user logs in in the energy saving mode, preparation for return is performed. At this time, the usage status of the function by the user is determined. Then, in response to this determination, the power supplies of the operation panel unit 16, the document reading unit 12, and the image forming unit 17 are controlled to be turned on or off, respectively.

In the return control process of the present embodiment, the control unit 10 mainly executes the program stored in the storage unit 19 in cooperation with each unit and uses the hardware resources.

Hereinafter, with reference to the flowchart of FIG. 4, the details of the return control process are described step by step.

(Step S101)

At first, the login unit 110 performs a login process. In the example of the present embodiment, at the time of this process, the image forming apparatus 1 is in the energy saving mode, and some units are not supplied with power. However, at least a part of the circuits of the control unit 10, the network transmitting and receiving unit 15, and the authentication unit 22 of the operation panel unit 16 are power-supplied and activated.

In this state, the login unit 110 refers to the account setting 200 and authenticates the user. At this time, when the login unit 110 receives an authentication request from the external terminal, or the like, or acquires a job 300, the login unit 110 sends and receives authentication information such as a user ID, a password, and the like, from and to the terminal. As a result, the login unit 110 may allow the user to log in remotely. In this case, the card ID of the card and the authentication information stored in the card are referred to, and the login unit 110 succeeds in logging in if these matches the data in the account setting 200.

Alternatively, the login unit 110 may be authenticated by the authentication unit 22 of the operation panel unit 16 by reading the user's card or performing biometric authentication. Further, the login unit 110 may be authenticated by inputting a PIN, a password, or the like, from the input unit 20 of the operation panel unit 16. In these cases, as well, the login unit 110 succeeds in logging in if the inputted data matches the data of the account setting 200.

(Step S102)

Next, the power supply control unit 100 determines whether or not there is the job 300 in the print box 231. As mentioned above, the print box 231 is an area for temporarily storing document data in the document box 230 as the job 300 for printing, and for the user to select to print on the operation panel unit 16. That is, because the document data stored in the print box 231 is deleted after printing, there is a high possibility that the job 300 is printed immediately at the time of login. Therefore, the power supply control unit 100 determines the usage status of the function depending on whether or not there is the job 300 to be printed.

The power supply control unit 100 determines Yes if the job 300 exists in the print box 231 of the document box 230. The power supply control unit 100 determines No if the job 300 does not exist in the print box 231.

In the case of Yes, the power supply control unit 100 advances the process to step S103.

In the case of No, the power supply control unit 100 advances the process to step S104.

(Step S103)

If there is the job 300 in the print box 231, the power supply control unit 100 performs the print box determination process.

Here, when the document data exists as the job 300 in the print box 231, there is a high possibility that the user displays the display unit 21 of the operation panel unit 16 and selects the document data to perform the printing process. Therefore, the power supply control unit 100 determines whether or not power is supplied to each unit necessary when the print box function is used. In this determination, the power control unit 100 turns on the operation panel unit 16 and the image forming unit 17 and turns off the document reading unit 12 in the same manner as the setting of the document box print in the function power saving setting 210.

After that, the power supply control unit 100 advances the process to step S109.

(Step S104)

Next, the power supply control unit 100 determines whether or not there is a function used immediately before.

If there is a function that was used immediately before, the user is likely to select the same function. Therefore, the power supply control unit 100 first determines the power supply based on the function used immediately before, not on the function mainly used. The power supply control unit 100 refers to the usage function history 220, and it determines Yes if there is a function used by the user until the last set time. The power supply control unit 100 determines No if there is no function used immediately before. Here, the power supply control unit 100 may determine No if the login process is performed from the operation panel unit 16 and the function used is the print function. The reason for this is described later.

In the case of Yes, the power supply control unit 100 advances the process to step S105.

In the case of No, the power supply control unit 100 advances the process to step S106.

(Step S105)

If there is a function used immediately before, the power supply control unit 100 performs the function determination process immediately before.

The power control unit 100 determines the power supply according to the function used immediately before by the user. Thus, the power supply control unit 100 refers to the function power saving setting 210, and it determines whether to turn on or off the power supply to each unit according to this function.

Here, the power supply control unit 100 turns off all power supplies of the operation panel unit 16, the document reading unit 12, and the image forming unit 17 when the function used immediately before was the print function, or when the above login process was performed remotely by Bluetooth (registered trademark), or the like. As a result, wasteful power consumption can be suppressed in a case when the image forming unit 17 immediately returns from the energy saving mode to the normal mode immediately after login, but the job 300 is not immediately transmitted from the external terminal.

After that, the power supply control unit 100 advances the process to step S109.

(Step S106)

Next, the power supply control unit 100 determines whether or not there is the initial screen setting.

The power control unit 100 refers to the account setting 200, and it determines Yes if the initial screen setting is set in the account of the logged-in user. In other cases, the power supply control unit 100 determines No.

In the case of Yes, the power supply control unit 100 advances the process to step S107.

In the case of No, the power supply control unit 100 advances the process to step S108.

(Step S107)

If there is the initial screen setting, the power supply control unit 100 performs an initial screen setting determination process.

The power supply control unit 100 determines the usage status of the function based on the initial screen setting. Specifically, when the initial screen is set, the power supply control unit 100 refers to the function power saving setting 210 based on the function corresponding to the initial screen, and it determines whether to turn on or off the power of each unit.

After that, the power supply control unit 100 advances the process to step S109.

(Step S108)

Here, the power supply control unit 100 performs the main use function determination process.

The power control unit 100 determines the presence or absence of power supply by the function mainly used by the user after the determination based on the presence or absence of the above-mentioned job 300, the function used immediately before, and the initial screen setting.

Specifically, the power supply control unit 100 refers to the usage history information of the user in usage function history 220 and determines the function mainly used based on the usage rate of the function.

More specifically, the power supply control unit 100 determines that, for example, the function mainly used is the scanning function when equal or greater than the specified ratio in the executed function is the scanning function, that is, the usage rate is equal or greater than the specific ratio. For this specific ratio, for example, a value such as 65% to 85% can be set according to the history amount and bias, or the like, of the usage function history 220. The same applies for other functions. On the other hand, when the usage rates of all the functions are uniformly used with a difference of about several percent to a dozen percent, the power supply control unit 100 determines that the main usage function is a copying (copy) function. This is because each part is set to be turned on.

The power supply control unit 100 refers to the function power saving setting 210, and it determines whether to turn on or off the power supply of each unit according to the determined function mainly used.

(Step S109)

Here, the power supply control unit 100 performs a start-up process after the determination.

The power supply control unit 100 controls the power supply of the operation panel unit 16, the document reading unit 12, and the image forming unit 17 to be turned on or off, respectively, according to the determination of the usage status of the functions by each of the above-mentioned processes.

As described above, the return control process according to the embodiment of the present disclosure is completed.

As configured in this way, the following effects can be obtained.

In recent years, it has been necessary to reduce the amount of electric power used due to environmental problems. In order to reduce power consumption, the image forming apparatus is also required not to supply power for functions not used by the user when returning from the energy saving mode.

However, whether or not the user uses the feature is recognized only by the user's function usage rights or by the user changing the settings of the operation panel. Even in the typical technology, the presence or absence of power supply is controlled by the authority to use the function part of the user, so that it is not possible to switch the presence or absence of power supply when the authority is not set.

For this reason, it has become inconvenient for users who usually use functions such as copying that take a long time to start.

On the other hand, the image forming apparatus 1 according to the embodiment of the present disclosure is an image forming apparatus capable of switching between an energy saving mode and a normal mode that consumes more power than the energy saving mode, including: an operation panel unit 16 that allows a user to operate and instruct; a document reading unit that reads a mounted document according to the user's scanning instruction; an image forming unit 17 that forms an image on recording paper according to the user's output instruction; and a power control unit 100 that determines whether or not power is supplied depending on usage status of function by the user, and, when returning from the energy saving mode to the normal mode, control each of the power supplies of the operation panel unit 16, the document reading unit 12, and the image forming unit 17 to be turned on or off according to determination.

With this configuration, it is possible to switch the presence or absence of power supply even if the authority is not set. Further, depending on the usage status of the user's function, it is possible to automatically switch the presence or absence of power supply without switching the setting on the operation panel unit 16.

In addition, depending on the usage status of the image forming apparatus of the user, it is possible to turn on the power only for the unit according to the required function without turning on the power for the unit according to the function not required. As a result, the electric power can be reduced efficiently. Furthermore, the power can be turned on quickly for the unit according to the required function.

In the image forming apparatus 1 according to the embodiment of the present disclosure, the power supply control unit 100 determines the usage status of function based on presence or absence of a job 300 for which an image is to be formed, function used immediately before, initial screen setting, and function mainly used.

With this configuration, determination based on whether or not there is a job 300 in the print box 231, determination based on the function used immediately before, determination based on the initial screen setting, and determination based on the function mainly used are performed in order. This makes it possible to appropriately control the power on or off of the operation panel unit 16, the document reading unit 12, and the image forming unit 17. As a result, it is possible to grasp the usage status of the user's function and control the power supply more reliably. Therefore, it can contribute to power saving.

In the image forming apparatus 1 according to the embodiment of the present disclosure, the power supply control unit 100, as for the presence or absence of the job 300 for which the image is to be formed, when the job 300 is stored in the print box 231 in which the job 300 is erased after printing, controls the power of the operation panel unit 16 and the image forming unit 17 to be turned on and controls the power of the document reading unit 12 to be turned off.

With this configuration, when printing immediately by the print box function is expected, it is possible to reliably control the power supply of each part.

Further, in the image forming apparatus 1 according to the embodiment of the present disclosure, the power supply control unit 100, as the function used immediately before, when scanning function is used, controls the power of the operation panel unit 16 and the document reading unit 12 to be turned on and controls the power of the image forming unit 17 to be turned off, when copying function is used, controls the power of the operation panel unit 16, the document reading unit 12, and the image forming unit 17 to be turned on, when document box print function is used, controls the power of the operation panel unit 16 and the image forming unit 17 to be turned on and controls the power of the document reading unit 12 to be turned off, when document box transmission function is used, controls the power of the operation panel unit 16 to be turned on and controls the power of the document reading unit 12 and the image forming unit 17 to be turned off, when facsimile function is used, controls the power of the operation panel unit 16 and the document reading unit 12 to be turned on and controls the power of the image forming unit 17 to be turned off, and when printing function is used, controls the power of the operation panel unit 16, the document reading unit 12, and the image forming unit 17 to be turned off.

With this configuration, it is possible to appropriately control the power supply of each part according to the function used immediately before.

Further, in the image forming apparatus 1 according to the embodiment of the present disclosure, the power supply control unit 100, as function set as the initial screen setting, when scanning function is set, controls the power of the operation panel unit 16 and the document reading unit 12 to be turned on and controls the power of the image forming unit 17 to be turned off, when copying function is set, controls the power of the operation panel unit 16, the document reading unit 12, and the image forming unit 17 to be turned on, when document box print function is set, controls the power of the operation panel unit 16 and the image forming unit 17 to be turned on and controls the power of the document reading unit 12 to be turned off, when document box transmission function is set, controls the power of the operation panel unit 16 to be turned on and controls the power of the document reading unit 12 and the image forming unit 17 to be turned off, when facsimile function is set, controls the power of the operation panel unit 16 and the document reading unit 12 to be turned on and controls the power of the image forming unit 17 to be turned off, and when print function is set, controls the power of the operation panel unit 16, the document reading unit 12, and the image forming unit 17 to be turned off.

With this configuration, it is possible to appropriately control the power supply of each part according to the function set as the initial screen setting.

Further, in the image forming apparatus 1 according to the embodiment of the present disclosure, the power supply control unit 100, as the function mainly used, when the scanning function is mainly used, controls the power of the operation panel unit 16 and the document reading unit 12 to be turned on and controls the power of the image forming unit 17 to be turned off, when the copying function is mainly used, controls the power of the operation panel unit 16, the document reading unit 12, and the image forming unit 17 to be turned on, when the document box print function is mainly used, controls the power of the operation panel unit 16 and the image forming unit 17 to be turned on and controls the power of the document reading unit 12 to be turned off, when the document box transmission function is mainly used, controls the power of the operation panel unit 16 to be turned on and controls the power of the document reading unit 12 and the image forming unit 17 to be turned off, when the facsimile function is mainly used, controls the power of the operation panel unit 16 and the document reading unit 12 to be turned on and controls the power of the image forming unit 17 to be turned off, and when the printing function is mainly used, controls the power of the operation panel unit 16, the document reading unit 12, and the image forming unit 17 to be turned off.

With this configuration, it is possible to appropriately control the power supply of each part according to the function mainly used.

Further, in the image forming apparatus 1 according to the embodiment of the present disclosure, the power supply control unit 100 determines the function mainly used by usage rate of the function.

With this configuration, it is possible to appropriately control the power supply of each part by determining the function mainly used according to the usage rate of each function. That is, even if it is not possible to determine, as above-mentioned, based on the presence or absence of the job 300 to be image formed, the function used immediately before, and the initial screen setting, it is possible to control the power supply more appropriately by the function.

OTHER EMBODIMENTS

In the above-described embodiment, an example of controlling the power on/off of the operation panel unit 16, the document reading unit 12, and the image forming unit 17 has been described.

However, with respect to each of the other units, for example, the network transmitting and receiving unit 15 and the fax transmitting and receiving unit 18 may be determined whether or not power is supplied depending on the usage status of the functions. In addition, as regarding the operation panel unit 16, the input unit 20, the display unit 21, and the authentication unit 22, whether or not power is supplied may be determined finer units, such as turning on or off the power of each backlight and turning on or off the power of each circuit.

With such a configuration, it is possible to further contribute to power saving.

Further, in the above-described embodiment, an example in which the power on/off of each part is similarly controlled when the job 300 exists in the print box 231 and when the document box print function uses or is used are described. However, these may be set separately. For example, even if the document data exists as the job 300 in the print box 231, it is possible to use a function of converting the temporary file so that the document data remains in the user's document box 230. When the user uses or has been used such a function, the power of the operation panel unit 16 may be controlled to be turned on, and the power of the document reading unit 12 and the image forming unit 17 may be controlled to be turned off.

Further, in the above-described embodiment, an example in which the function mainly used is determined based on the usage rate of the user has been described.

However, the usage pattern of the user may be determined by the usage function history 220 to determine the function mainly used, or the function to be used next may be predicted. For these determination and prediction, it is possible to use a statistical method such as Bayesian estimation, a machine learning method such as a decision tree or an artificial neural network, or the like.

Further, the present disclosure can be applied to an information processing apparatus other than the image forming apparatus. That is, it may be configured that a network scanner, a server, or the like, to which the scanner is separately connected by USB, or the like may be used.

Further, it goes without saying that the configuration and operation of the above-described embodiment are examples, and it can be appropriately modified and executed without departing from the aim of the present disclosure.

What is claimed is:

1. An image forming apparatus capable of switching between an energy saving mode and a normal mode that consumes more power than the energy saving mode, comprising:
    an operation panel unit that allows a user to operate and instruct;
    a document reading unit that reads a mounted document according to the user's scanning instruction;
    an image forming unit that forms an image on recording paper according to the user's output instruction; and
    a power control unit configured to determine whether or not power is supplied depending on usage status of function by the user, and, when returning from the energy saving mode to the normal mode, control each of the power supplies of the operation panel unit, the document reading unit, and the image forming unit to be turned on or off according to determination, wherein
    the power supply control unit determines the usage status of function based on presence or absence of a job for which an image is to be formed, function used immediately before, initial screen setting, and function mainly used.

2. The image forming apparatus according to claim 1, wherein
    the power supply control unit, as for the presence or absence of the job for which the image is to be formed, when the job is stored in the print box in which the job is erased after printing, controls the power of the operation panel unit and the image forming unit to be turned on and controls the power of the document reading unit to be turned off.

3. The image forming apparatus according to claim 1, wherein
    the power supply control unit, as the function used immediately before,
    when scanning function is used, controls the power of the operation panel unit and the document reading unit to be turned on and controls the power of the image forming unit to be turned off,
    when copying function is used, controls the power of the operation panel unit, the document reading unit, and the image forming unit to be turned on,
    when document box print function is used, controls the power of the operation panel unit and the image forming unit to be turned on and controls the power of the document reading unit to be turned off,
    when document box transmission function is used, controls the power of the operation panel unit to be turned on and controls the power of the document reading unit and the image forming unit to be turned off,
    when facsimile function is used, controls the power of the operation panel unit and the document reading unit to be turned on and controls the power of the image forming unit to be turned off, and
    when printing function is used, controls the power of the operation panel unit, the document reading unit, and the image forming unit to be turned off.

4. The image forming apparatus according to claim 1, wherein
    the power supply control unit,
    as function set as the initial screen setting,
    when scanning function is set, controls the power of the operation panel unit and the document reading unit to be turned on and controls the power of the image forming unit to be turned off,
    when copying function is set, controls the power of the operation panel unit, the document reading unit, and the image forming unit to be turned on,
    when document box print function is set, controls the power of the operation panel unit and the image forming unit to be turned on and controls the power of the document reading unit to be turned off,
    when document box transmission function is set, controls the power of the operation panel unit to be turned on and controls the power of the document reading unit and the image forming unit to be turned off,
    when facsimile function is set, controls the power of the operation panel unit and the document reading unit to be turned on and controls the power of the image forming unit to be turned off, and
    when print function is set, controls the power of the operation panel unit, the document reading unit, and the image forming unit to be turned off.

5. The image forming apparatus according to claim 1, wherein
    the power supply control unit,
    as the function mainly used,
    when the scanning function is mainly used, controls the power of the operation panel unit and the document reading unit to be turned on and controls the power of the image forming unit to be turned off, when the copying function is mainly used, controls the power of the operation panel unit, the document reading unit, and the image forming unit to be turned on, when the document box print function is mainly used, controls the power of the operation panel unit and the image forming unit to be turned on and controls the power of the document reading unit to be turned off, when the document box transmission function is mainly used, controls the power of the operation panel unit to be turned on and controls the power of the document reading unit and the image forming unit to be turned off, when the facsimile function is mainly used, controls the power of the operation panel unit and the document reading unit to be turned on and controls the power of the image forming unit to be turned off, and when the printing function is mainly used, controls the power of the operation panel unit, the document reading unit, and the image forming unit to be turned off.

6. The image forming apparatus according to claim 5, wherein
the power supply control unit determines the function mainly used by usage rate of the function.

7. A return control method executed by an image forming apparatus capable of switching between an energy saving mode and a normal mode that consumes more power than the energy saving mode,
the image forming apparatus having
an operation panel that allows a user to operate and instruct,
a document reading unit that reads a mounted document according to the user's scanning instruction, and
an image forming unit that forms an image on the recording paper according to the output instruction of the user, and
the method comprising the steps of:
determining whether or not power is supplied depending on usage status of function by the user, and,
controlling, when returning from the energy saving mode to the normal mode, each of the power supplies of the operation panel unit, the document reading unit, and the image forming unit to be turned on or off according to determination, wherein
the usage status of function is determined based on presence or absence of a job for which an image is to be formed, function used immediately before, initial screen setting, and function mainly used.

8. The return control method according to claim 7, wherein
as for the presence or absence of the job for which the image is to be formed, when the job is stored in the print box in which the job is erased after printing, controlling the power of the operation panel unit and the image forming unit to be turned on and controlling the power of the document reading unit to be turned off.

9. The return control method according to claim 7, wherein
as the function used immediately before,
when scanning function is used, controlling the power of the operation panel unit and the document reading unit to be turned on and controlling the power of the image forming unit to be turned off,
when copying function is used, controlling the power of the operation panel unit, the document reading unit, and the image forming unit to be turned on,
when document box print function is used, controlling the power of the operation panel unit and the image forming unit to be turned on and controlling the power of the document reading unit to be turned off, when document box transmission function is used, controlling the power of the operation panel unit to be turned on and controlling the power of the document reading unit and the image forming unit to be turned off, when facsimile function is used, controlling the power of the operation panel unit and the document reading unit to be turned on and controlling the power of the image forming unit to be turned off, and when printing function is used, controlling the power of the operation panel unit, the document reading unit, and the image forming unit to be turned off.

10. The return control method according to claim 7, wherein
as function set as the initial screen setting,
when scanning function is set, controlling the power of the operation panel unit and the document reading unit to be turned on and controlling the power of the image forming unit to be turned off,
when copying function is set, controlling the power of the operation panel unit, the document reading unit, and the image forming unit to be turned on,
when document box print function is set, controlling the power of the operation panel unit and the image forming unit to be turned on and controlling the power of the document reading unit to be turned off,
when document box transmission function is set, controlling the power of the operation panel unit to be turned on and controlling the power of the document reading unit and the image forming unit to be turned off,
when facsimile function is set, controlling the power of the operation panel unit and the document reading unit to be turned on and controlling the power of the image forming unit to be turned off, and
when print function is set, controlling the power of the operation panel unit, the document reading unit, and the image forming unit to be turned off.

11. The return control method according to claim 7, wherein
as the function mainly used,
when the scanning function is mainly used, controlling the power of the operation panel unit and the document reading unit to be turned on and controlling the power of the image forming unit to be turned off,
when the copying function is mainly used, controlling the power of the operation panel unit, the document reading unit, and the image forming unit to be turned on,
when the document box print function is mainly used, controlling the power of the operation panel unit and the image forming unit to be turned on and controlling the power of the document reading unit to be turned off,
when the document box transmission function is mainly used, controlling the power of the operation panel unit to be turned on and controlling the power of the document reading unit and the image forming unit to be turned off,
when the facsimile function is mainly used, controlling the power of the operation panel unit and the document reading unit to be turned on and controlling the power of the image forming unit to be turned off, and
when the printing function is mainly used, controlling the power of the operation panel unit, the document reading unit, and the image forming unit to be turned off.

12. The return control method according to claim 11, wherein
the power supply control unit determines the function mainly used by usage rate of the function.

* * * * *